(No Model.)
J. BEHRINGER, W. STOUFFER & J. R. POTTS.
CORNSTALK SPLITTING AND BREAKING MACHINE.
No. 247,002. Patented Sept. 13, 1881.
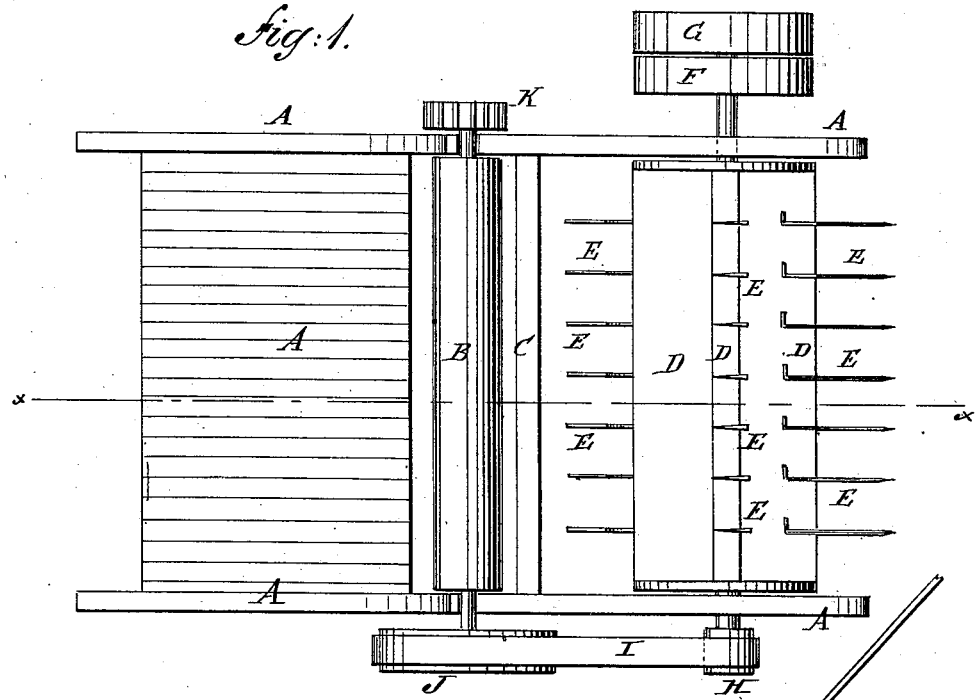
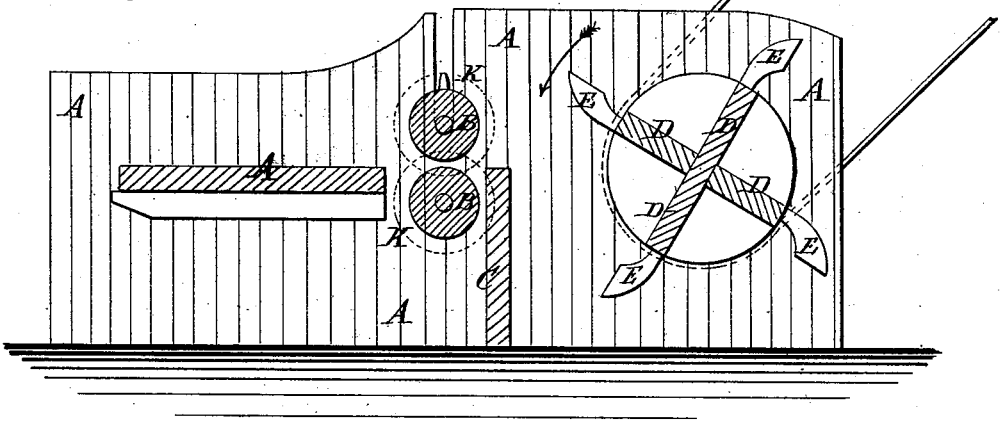
WITNESSES:
INVENTOR:
BY
ATTORNEYS.

UNITED STATES PATENT OFFICE.

JACOB BEHRINGER, OF BOWMANSDALE, WILLIAM STOUFFER, OF DILLSBURG, AND JOSEPH R. POTTS, OF MECHANICSBURG, PENNSYLVANIA.

CORNSTALK SPLITTING AND BREAKING MACHINE.

SPECIFICATION forming part of Letters Patent No. 247,002, dated September 13, 1881.

Application filed April 9, 1881. (No model.)

*To all whom it may concern:*

Be it known that we, JACOB BEHRINGER, of Bowmansdale, in the county of Cumberland, WILLIAM STOUFFER, of Dillsburg, in the county of York, and JOSEPH R. POTTS, of Mechanicsburg, in the county of Cumberland and State of Pennsylvania, have invented a new and Improved Machine for Splitting and Breaking Cornstalks, of which the following is a full, clear, and exact description.

Figure 1 is a plan view of our improvement. Fig. 2 is a sectional side elevation of the same, taken through the line *x x*, Fig. 1.

The object of this invention is to facilitate the handling of cornstalks when used as fodder.

A represents the feed-box, which is designed to be mounted upon a frame of suitable height.

B are two feed-rollers, placed one above the other at the forward end of the bottom of the feed-box A. The journals of the lower roller B revolve in stationary bearings in the sides of the box A, and the journals of the upper roller B revolve in vertical slots in the sides of the said box A, so that the said roller can adjust itself to the thickness of the stalks passing through the machine.

The upper roller B can be held down by its own weight, or it can be pressed down by springs or weights.

To the sides of the box A, in front of the feed-rollers, is secured an iron bar, C, set edgewise, and with its upper edge about upon a level with the top of the lower roller B.

To the sides of the box A, in front of the rollers B and bar C, is pivoted a skeleton or winged cylinder, D, which is made with four (more or less) wings.

To the edges of the wings of the cylinder D are attached knives E, which I prefer to make sword-shaped, but which can be made straight or of any other desired shape. The winged cylinder D is so placed that the knives E, as the said cylinder D revolves, will pass down at the forward side of and close to the bar C, so as to split the stalks as they project beyond the forward side of the said bar. As the split stalks are forced forward by the feed-rollers they are struck by the wings of the cylinder D and broken down across the edge of the iron bar C.

To one of the journals of the winged cylinder D is attached a fast pulley, F, and a loose pulley, G, to receive the driving-belt when the machine is driven by power, or a crank or crank-wheel when the machine is to be operated by hand. To the other journal of the cylinder D is attached a small pulley, H, around which passes a belt, I. The belt I also passes around a large pulley, J, attached to the journal of one of the rollers B. To the other journals of the rollers B are attached gear-wheels, K, the teeth of which mesh into each other, so that the said rollers B will revolve at the same speed; or a small gear-wheel can be attached to the cylinder D at the inner side of the drive-pulley F, into the teeth of which mesh the teeth of a second gear-wheel placed above the cylinder-journal upon a stud attached to the frame of the machine. The second gear-wheel is made of such a size that its center will be upon a level with the axis of the upper roller B. The teeth of the second gear-wheel mesh into the teeth of a large gear-wheel attached to the journal of the upper roller B. To the other journal of the cylinder D is attached a small gear-wheel the teeth of which mesh into the teeth of a large gear-wheel attached to the journal of the lower roller B. This arrangement of gearing we prefer.

With this construction the winged cylinder D will be revolved rapidly and the feed-roller B more slowly. With this construction as the cornstalks are fed through the machine they will be split by the knives E and will be broken down by the wings of the cylinder D, so that the said stalks can be handled with a fork with as much ease as hay or straw.

Another advantage of this treatment is that the cattle can eat more of the stalks than they can when the stalks are fed to them whole, or when cut crosswise in the ordinary manner.

Another advantage of this treatment is that the refuse stalks will be much sooner converted to manure then when left whole or cut crosswise.

Having thus described our invention, what we claim as new, and desire to secure by Letters Patent, is—

The combination, with a vertical bar, C, of the rotary knives E and wings or beaters D, the former arranged on the ends of the latter, whereby the stalks are first split by the knives and then broken by the wings, as described.

JACOB BEHRINGER.
    WILLIAM STOUFFER.
    JOSEPH R. POTTS.

Witnesses for J. Behringer:
 THOS. MCELHENEY,
 S. L. BOWMAN.

Witnesses for W. Stouffer:
 DAVID MCELHENEY,
 S. L. BOWMAN.

Witnesses for J. R. Potts:
 THOS. MCELHENEY,
 S. L. BOWMAN.